July 29, 1958   F. W. GUIBERT   2,844,964
LIQUID SAMPLER
Filed Dec. 6, 1952   3 Sheets-Sheet 1
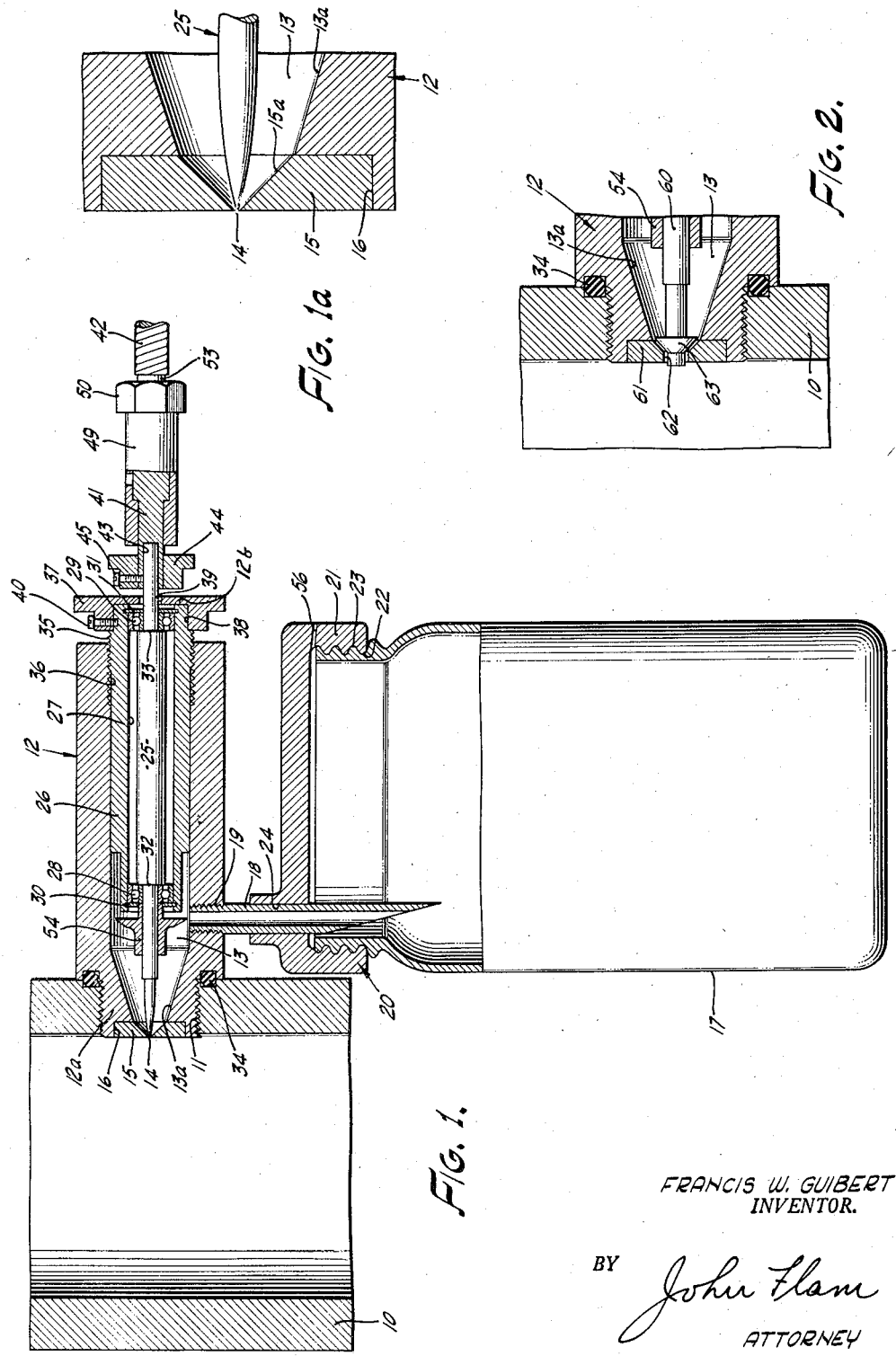
FRANCIS W. GUIBERT
INVENTOR.
BY John Flam
ATTORNEY July 29, 1958  F. W. GUIBERT  2,844,964
LIQUID SAMPLER
Filed Dec. 6, 1952  3 Sheets-Sheet 2
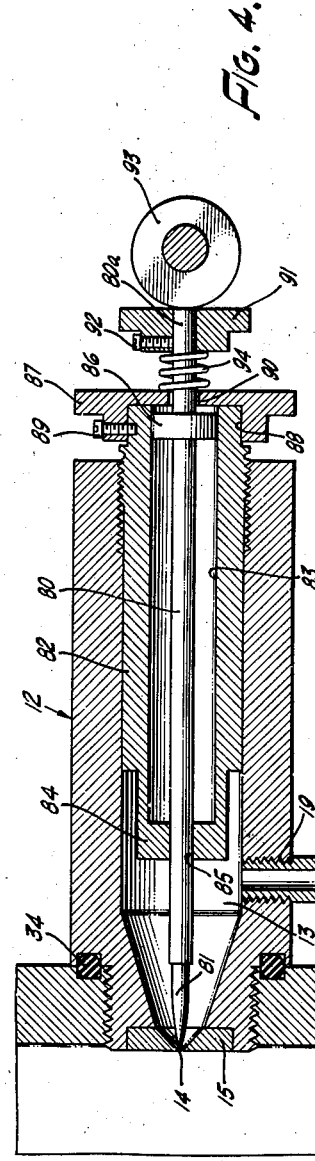
FRANCIS W. GUIBERT
INVENTOR.
BY John Flam
ATTORNEY July 29, 1958  F. W. GUIBERT  2,844,964
LIQUID SAMPLER
Filed Dec. 6, 1952  3 Sheets-Sheet 3
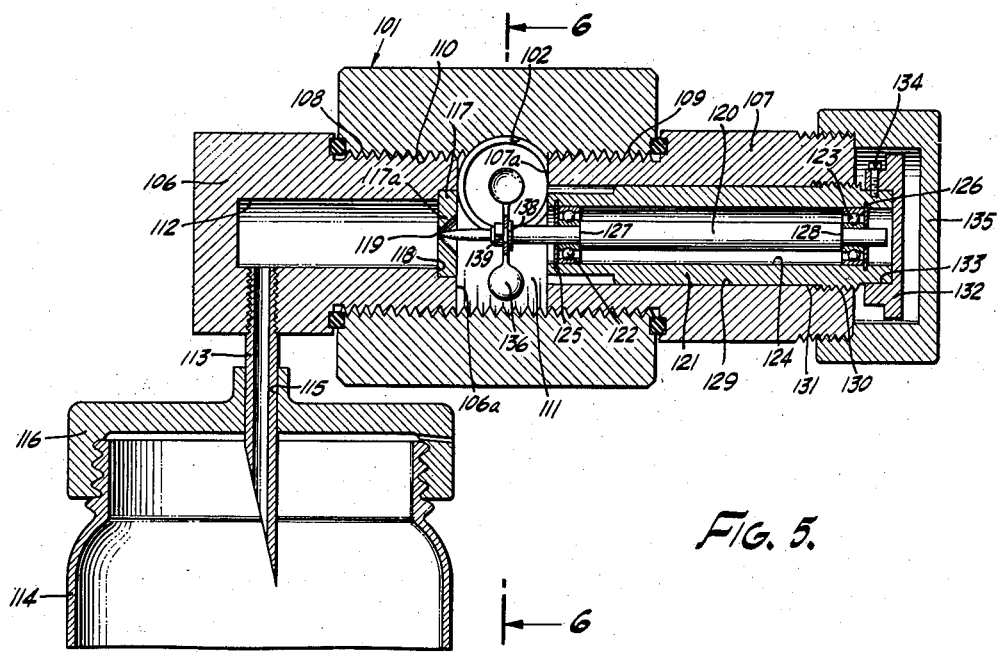
FIG. 5.
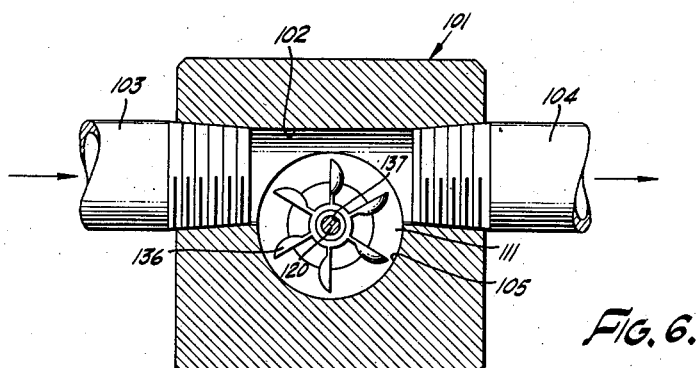
FIG. 6.
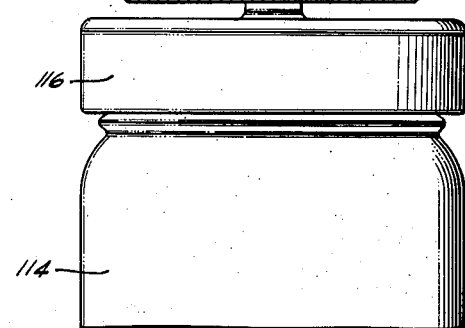
FRANCIS W. GUIBERT
INVENTOR.
BY *John Flann*
ATTORNEY

United States Patent Office 2,844,964
Patented July 29, 1958

2,844,964

LIQUID SAMPLER

Francis W. Guibert, Los Angeles, Calif.

Application December 6, 1952, Serial No. 324,481

6 Claims. (Cl. 73—422)

This invention relates to a device for collecting samples of liquids, such as water and hydrocarbon mixtures flowing in a conduit. The samples so collected are then made the subject of laboratory analysis.

The desirability of a continuous liquid sampler has been recognized, since intermittent sampling may not be reliable by virtue of the fact that the characteristics of fluid at a given point in a conduit are not unchanging with time. Intermittent sampling is nevertheless resorted to by virtue of certain problems arising in connection with continuous sampling. Continuous sampling has heretofore required a substantial quantity of sampled fluid and consequent waste and inconvenience unless provisions for exceedingly small flow are made.

Heretofore, an exceedingly small flow aperture introduced such problems as different rates of flow of the constituent materials through the aperture, giving a completely inaccurate sample, and the presence of colloidal foams on the exhaust side of the aperture tending to block flow or to cause unsteady flow characteristics.

It is an object of the present invention to provide a sampler incorporating an exceedingly small flow aperture in which the constituent materials of the fluid being sampled pass the aperture at the same rate, and in which the colloidal foam is dispersed. Accordingly, extremely small quantities of liquids can be continuously, regularly and accurately collected in the form of drops.

It is another object of the present invention to provide a device of this character in which the effective size of the flow aperture may be varied, in order to control the rate of collection and to compensate for different pressure and other characteristics of the fluid being sampled.

To accomplish these objects, a movable valve member, generally in the form of a needle valve, cooperates with a flow aperture. In some forms of the present invention, a knife-edge aperture is provided, and a needle valve either rotatable or reciprocable. In other forms of the present invention, a nozzle type aperture is provided, and a needle valve either rotatable or reciprocable, the nozzle type being particularly desirable in connection with extremely high pressures.

It is contemplated that, for purposes of accuracy, the sampler be located immediately downstream of a metering device. Without the agitating action of such meter, some constituent materials might tend to flow to the outside of the pipe to the partial exclusion of other constituents. By so locating the sampler, it is ensured that the sample withdrawn is a proportional representation of the entire flow, such flow through the pipe being homogeneous.

It is another object of this invention to provide a device of this character that serves to agitate the liquid at the inlet to the flow aperture in order that an accurate sample be made independently of another agitating device. For this purpose, the rotatable valve member carries impeller blades, also serving as a source of motion for the valve member.

It is another object of this invention to provide a device of this character that is simple and reliable, and easily disassembled for purposes of maintenance.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a longitudinal sectional view of a fluid sampler incorporating the present invention;

Fig. 1a is an enlarged sectional view of a portion of the device illustrated in Fig. 1;

Figs. 2 and 3 are enlarged fragmentary sectional views illustrating modified forms of a portion of the apparatus embodying the present invention;

Figs. 4 and 5 are longitudinal sectional views illustrating other forms, respectively, of the present invention; and Fig. 6 is a sectional view, taken along the plane indicated by line 6—6 of Fig. 5.

A small representative portion of the fluid flowing through a pipe line 10 (Fig. 1), such as oil from a well, other hydrocarbon mixtures or the like, is extracted therefrom continuously by the aid of the device to be presently described.

The pipe line 10 is provided with a threaded aperture 11 for accommodating an end 12a of a body member 12. The end 12a of the body member 12 is correspondingly threaded, and an O-ring 34 accommodated in appropriate grooves of the pipe 10 and body 12 maintains a proper sealing relationship to prevent undesired flow of fluid through the aperture 11.

The body member 12 is generally of hollow or tubular configuration, forming an interior chamber or space 13 into which a portion of the fluid of the pipe 10 is bypassed. For metering the fluid into the chamber 13, a small orifice 14 (see, also, Fig. 1a) forms the only communication between the interior of the pipe line 10 and the chamber 13 of the body. This orifice is formed in a valve seat insert 15 that is of suitable wear resistant material. A conical surface 15a (Fig. 1a) on the inner side of the insert 15 intersects the outer plane surface of the insert 15 to provide a knife edge forming the orifice 14. An enlarged recess 16 in the end 12a of the body 12 that is exposed to the interior of the pipe line 10, and surrounding the converging end 13a of the chamber 13, accommodates the insert 15, as by force-fitting. The conical surface 15a (Fig. 1a) of the insert 15 forms a smooth continuation of the converging end 13a of the chamber 13.

A collection jar 17 receives the fluid from the chamber 13. For this purpose, a tubular outlet forming member 18 communicates with the chamber 13 and the jar 17. The outlet member 18 is secured by the aid of threaded engagement with a lateral aperture 19 of the body 12 that is spaced from the inlet orifice 14. The jar 17 is detachably coupled to the body by the aid of a jar holding cap 20. This cap 20 has a depending flange 21 provided with interior threads 22 for receiving the corresponding threads 23 at the upper opening of the jar 17. The jar cap 20 is forced-fitted to the conduit member 18. For this purpose, the conduit member 18 extends through the cover member 20 and is accommodated in a bossed aperture 24 thereof. A vent 56 provides suitable exhaust to the atmosphere for maintaining proper pressure differential to permit flow through the body 12 and into the jar 17.

In order to provide a flow through the inlet orifice 14 of the order of a few drops per minute, the clearance at the orifice is quite small, such as about a thousandth of an inch, more or less. Such small flow is necessary in order that continuous sampling be practical, obviating waste and inconvenience in handling.

If the fluid being sampled be a mixture of water and oil, such as may be obtained directly from a well, the large pressure reduction due to the slight clearance at the orifice 14 causes the constituent elements of the fluid to break up into extremely small globules. A stiff foam or colloid is thus formed on the inside of the orifice 14. Such foam extends over and near the edges of the orifice 14 and, through forces arising largely through surface tension and adhesion, resistance to flow through the orifice occurs. If the flow is not almost entirely prevented by the foam, the vagaries in the formation thereof introduce substantial variations in the rates of flow through the orifice 14; incorrect sampling may therefore result. The tendency of such foam to oppose flow through the orifice 14 is especially great in connection with oils of substantial viscosity.

In order that sampling at a continuously uniform rate be achieved without increasing the orifice size, means are provided for preventing the colloid or foam from retarding uniform flow through the orifice. For this purpose, an agitator member 25 ending in a needle is provided that serves to break up and disperse the foam. The needle end of the agitator 25 extends into the closes the orifice 14 when the sampler is not used. When the sampler is used, the needle is slightly withdrawn. The annular clearance between the needle and the orifice permits flow through the sampler. The extent of withdrawal of the needle determines the clearance, and hence regulates the flow through the sampler. The agitator member 25 is of elongate form, and is rotatably supported by a sleeve 26.

For this purpose, the member 25 extends through a longitudinal aperture 27 of the sleeve 26. Ball bearing structures 28 and 29 are carried internally of the sleeve aperture 27 and also accommodate reduced portions of the needle member 25. Split spring snap rings 30 and 31 that are accommodated in appropriate recesses of the sleeve 26 cooperate with shoulders 32 and 33 of the member 25 properly to retain the member 25 and bearings 28 and 29 in definite longitudinal positions with respect to the sleeve 26.

The sleeve 26 is, in turn, guidingly received in the right-hand end of the chamber 13, as viewed in Fig. 1. For this purpose, the recess forming the chamber 13 opens at the end 12b of the body 12 remote from the inlet end 12a. The sleeve carries external threads 35 in engagement with internal threads 36 of the valve body 12.

The end of the agitator 25 is tapered to serve additionally as a valve member controlling the rate of flow through the orifice 14. Such control is achieved by adjusting the position of the sleeve 26 on the body, made possible by the threaded engagement between the sleeve 26 and the valve body 12. In order to facilitate this adjustment, a knurled adjusting knob 37 is carried at that end of the sleeve 26 that projects rearwardly of the body 12. The knob 37 forms a cup-shaped recess 38 receiving the end of the sleeve 26. The valve member 25 extends with substantial clearance through a central aperture 39 of the knob 37. The knob 37 and sleeve 26 are secured against relative rotation by the aid of a set screw 40.

Adjustment of the position of the sleeve 26 in the chamber 13 by the aid of the knob 37 serves to adjust the clearance between the pointed end of the valve member 25 and the orifice 14. Accordingly, by these means, the effective flow area of the orifice, and hence the rate of flow, is controlled.

Rotation of the valve member 25 causes the colloidal foam at the inside of the orifice 14 to be broken and dispersed so that uniform and continuous flow can be achieved.

For rotating the valve member 25, a coupling member 41 is provided that serves to connect the end of the member 25 to a flexible shaft 42. This shaft 42 may be driven by being suitably connected to a motor or the like. The connector 41 at one end has an aperture 43 receiving the end of the member 25. A knob 44, extending over the end of the connector 41, mounts a set screw 45 engaging the end of the valve member 25 to prevent relative rotation thereof with respect to the connector 41. A sleeve 49 and sleeve cap 50 serve to restrain the shaft 42 against separation from the connector 41, all in a conventional manner.

A slinger 54 operates further to urge the liquid in the chamber 13 radially outwardly, preventing flow along the rotatable member 25, and helping to clear chamber 13 through the exhaust or outlet member 18.

Preferably, the sampler is inserted in that portion of the pipe line 10 that is immediately downstream of a meter or the like. Accordingly, the agitation of the liquid thereby caused ensures a uniform consistency throughout the area of the pipe line 10. The portion of the liquid passing through the orifice 14 is thus accurately representative of the entire body of fluid passing through the pipe line 10.

Continuous flow is ensured through the small orifice 14 by the adjustment and aid of the cyclic motion of the rotary member 25 dispersing the foam or colloid. The knife-edge form of the orifice 14 ensures uniform rates of flow therethrough of the constituent elements of the fluid. Samples may thereby be collected uniformly and accurately throughout a substantial period of operation. The jar 17, while of small size, has a capacity sufficient, with respect to this small flow, to collect the fluid throughout a period of the order of twenty-four hours.

Fig. 2 illustrates a slightly varied form of an agitator member 60 and inlet passage forming insert 61. The insert 61 has a through aperture 62, which diverges in the direction of flow for only a portion of the length of the aperture. The member 60 has a configuration corresponding to that of the aperture 62, the valve member 60 having a substantially frusto-conical portion 63 thereof diverging from a cylindrical end portion, the frusto-conical portion forming a surface opposed to the diverging portion of the inlet passageway 62. Longitudinal adjustment of the valve member 60 causes these opposed surfaces to move toward or away from each other to alter the rate of flow. The valve member 60 is mounted in a manner identical to that disclosed in the form illustrated in Fig. 1, the rotation of the valve member 60 serving to ensure proper and uniform flow through the inlet passage 62.

The form illustrated in Fig. 3 may be particularly useful where extremely high pressures are encountered. The present form is similar to, but the reverse of, that disclosed in Fig. 2. In this instance, however, a valve member 70 and an inlet passage forming insert 71 have opposed tapered surfaces 72 and 73 that converge inwardly in the direction of flow.

In the form illustrated in Fig. 4, the body member 12 provides a chamber 13, as in the previous forms. The insert 15 provides an inlet orifice 14 to the chamber; and an outlet passage forming member 18, communicating with the chamber, discharges the sampled fluid into the collection jar 17.

In the present form, however, a needle valve or agitator member 80 is provided that is longitudinally reciprocable to provide a cyclic motion for dispersing the liquid at the inner side of the orifice. The valve member 80 may manually be worked back and forth in the orifice 14, or otherwise be cyclically moved, so that the tapered end 81 closely approaches the edge of the orifice 14, to jar loose collections of wax or the like.

The member 80 is supported for such longitudinal movement by the aid of a sleeve 82 telescopingly received in the right-hand end of the chamber 13. The sleeve 82 has a longitudinal recess 83, through which the valve member 80 extends. An inwardly extending flange 84 of the sleeve 82 provides an aperture 85 guidingly receiving the forward portion of the valve member 80. A flange 86, near the other end of the member 80, is slidably engageable with the walls of the recess 83. The member 80 is not only supported for longitudinal movement, but is also rotatably supported. Thus, rotation may also be imparted to the member 80 which, coupled with cyclic longitudinal movement, may be especially effective in clearing the orifice 14.

The sleeve 82 is adjustably mounted in the chamber 13 by the aid of threaded engagement therewith. A knob 87 has a cup-shaped recess 88 receiving the end of the sleeve 82. A set screw 89 secures the knob 87 of the sleeve 82 against relative angular movement. The knob 87 may be appropriately knurled to facilitate adjustment of the sleeve 82 with respect to the body 12.

The end 80a of the valve or agitator member 80 extends rearwardly of the sleeve 82, an aperture 90 in the bottom of the recess 88 of the knob 87 providing ample clearance for passage of this end 80a. A knurled knob 91 is secured to this end 80a as by the aid of a set screw 92. An eccentric 93, the eccentricity of which is exaggerated, is in engagement with the end 80a of the valve member 80. Accordingly, rotation of the eccentric 93 causes a continuous cyclic or reciprocatory movement of the needle valve member 80. A compression spring 94 engages respectively opposed surfaces of the knobs 87 and 91 for maintaining the end 80a of the valve member 80 in engagement with the eccentric 93.

In the forms illustrated in Figs. 1 to 4, inclusive, the valve structures can be readily removed without otherwise disassembling the remaining structure. Thus, the sleeve 26 and the sleeve 82 can be entirely detached from the body 12 for replacement and repair.

In the forms illustrated in Figs. 5 and 6, a body member 101 has a through transverse passageway 102 aligned with and forming a part of a pipe line formed by inlet and outlet conduits 103 and 104, respectively. These conduits 103 and 104 register with opposite ends of the passageway 102.

A through passageway 105 intersects the possageway 102 at right angles thereto. Hollow fittings 106 and 107 extend into the through aperture 105 from opposite ends thereof. The fittings 106 and 107 are provided with suitable threads 108 and 109 engaging threads 110 provided in the aperture 105.

The the inner ends 106a and 107a of the fittings 106 and 107 are spaced from each other to define an enlargement 111 of the passage 102. A chamber formed by a recess 112 of the fitting 106 communicates with the enlargement 111 through a restricted opening. For this purpose, an orifice forming insert 117 is accommodated against a shoulder 118 formed at the inner end of the recess 112. A conical surface 117a on one side of the insert 117 provides a knife-edge orifice 119, as in the form illustrated in Fig. 1. This orifice 119 has proportions similar to those described in connection with the form illustrated in Fig. 1. This orifice 119 provides restricted flow into the chamber from the enlargement 111 of the passage 102. Accordingly, a small portion of the fluid flowing through the passage 102 is continuously diverted into the chamber formed by the recess 112.

A tubular outlet forming member 113 is in communication with the recess or passage 112 and forms the outlet therefrom to a collection jar 114. The outlet conduit 113 extends through a bossed aperture 115 in a jar holding cap 116, substantially as in the previous forms.

A needle valve member 120 is rotatably and adjustably carried by the other fitting 107. A sleeve 121, similar to the sleeve 26 of the form illustrated in Fig. 1, rotatably mounts the needle valve structure 120. The valve member 120 extends in a through aperture 124 of the sleeve 121. For rotatably mounting the valve member 120, ball bearing structures 122 and 123 are accommodated on reduced portions of the valve member 120. Resilient split rings 125 and 126, accommodated in appropriate recesses in the sleeve aperture 124, cooperate with shoulders 127 and 128 of the valve member 120 to retain the valve member 120 and the bearing structures 122 and 123 in definite longitudinal positions with respect to the sleeve 121.

The sleeve 121 is telescopically and guidingly received in a through bore 129 of the fitting 107. The valve member 120 extends across the chamber 111 and is aligned with the orifice 119. The tapered end of the valve member 120 is located adjacent the edges forming the orifice 119 or within the orifice 119. Exterior threads 130 of the sleeve 121 and interior threads 131 of the fitting 107 serve to mount the sleeve 121 for longitudinal adjustment. Such longitudinal adjustment serves to move the end of the valve member 120 with respect to the orifice 119 to control the effective flow area thereof.

To facilitate this adjustment of the sleeve 121 and valve member 120, a knurled knob 132 is provided. This knob 132 has a cup-shaped recess 133 receiving the end of the sleeve 121. A set screw 134 holds the knobs 132 against angular movement with respect to the sleeve 121. A cap 135 threadedly engages the exterior of the fitting 107, and encloses the adjusting knob 132.

In order to agitate the fluid passing through the body member 110 so that it is of homogeneous consistency, an impeller blade structure 136 is mounted upon the valve member 120. For this purpose, the impeller 136 has a central aperture 137 through which the end of the valve member 120 extends. A flange 138 on the valve member 120 cooperates with a lock nut 139 to secure the impeller 136 to the valve member 120.

As shown most clearly in Fig. 6, the axis of the valve member 120 lies substantially below the axis of the fluid passageway 102 of the body member 101. Accordingly, there is an appropriate imbalance produced to cause rotation of the valve member and the impeller 136 in a clockwise direction with the direction of fluid flow indicated by the arrows. By virtue of the agitating action of this impeller, that portion of the fluid passing through the orifice 119 is an accurate sample of the fluid passing through the body member 101. In addition, the rotation of the valve member 102 caused by the impeller 136 promotes continuous and uninterrupted flow through the orifice 119.

The form illustrated in Figs. 5 and 6 brings the fluid of the conduit 103, 104 to a homogeneous mixture so that the sample received in the jar 114 is accurate. This is achieved by the impeller 136. This form is useful where the installation is made remote from a meter, which meter might otherwise be relied upon for this function.

By providing a connector, such as is shown in connection with the form illustrated in Fig. 1, an outside source of rotary motion could be used to impart rotary motion to the valve member 120.

The inventor claims:

1. In a device for collecting samples from a stream of fluid: means forming an orifice for the passage of fluid; a member having a surface cooperating with the orifice to define a flow path through the orifice; said member having a stem aligned with the orifice; a sleeve supporting the stem; means adjustably mounting the sleeve for movement in a direction longitudinally of the stem for varying the size of the flow path through said orifice; and means for moving said member through repeated cycles with respect to the orifice.

2. In a fluid sampler: a conduit for the through flow of fluid; means defining a sampling passage transverse to the conduit; an outlet member for the passage; means defining an orifice between the conduit and the passage; a member having a surface cooperating with the orifice to determine the effective area of the orifice opening; said member having a stem aligned with the orifice; means for rotatably supporting the stem; and means carried by the stem and located in the path of through flow of the fluid in the conduit for rotating the stem.

3. In a fluid sampler: a conduit; means forming a sampling passage from the conduit; means defining an inlet orifice between the conduit and the sampling passage; a member having a surface cooperating with the orifice to determine the effective area of the opening of said orifice; said member having a rotary shaft aligned with said orifice; a mounting fixed with respect to the orifice; a sleeve carried by the mounting for longitudinal movement, the sleeve extending substantially parallel to the shaft; bearings carried by the sleeve for rotatably supporting the shaft; means coupling the shaft and the bearings for longitudinal movement with the sleeve; means for adjusting the longitudinal position of the sleeve with respect to the mounting and with respect to the orifice; and means for rotating said shaft.

4. In a fluid sampler: a conduit for the through flow of fluid; means defining a sampling passage transverse to the conduit; an outlet member for the passage; means defining an orifice between the conduit and the passage; a member having a surface cooperating with the orifice to determine the effective area of the orifice opening; said member having a stem aligned with the orifice; a mounting fixed with respect to the orifice; a sleeve surrounding the stem and carried by the mounting for longitudinal movement in a direction toward and away from said orifice; bearing structures carried by hte sleeve for rotatably supporting the stem; means coupling the stem and the bearings for longitudinal movement with the sleeve; means for adjusting the longitudinal position of the sleeve with respect to the mounting and with respect to the orifice; and means for rotating the stem.

5. The combination as set forth in claim 4, in which the means for rotating the stem comprises an impeller structure mounted on the stem and in the path of through flow of fluid in the conduit.

6. The combination as set forth in claim 4 in which the means for rotating the stem is operated by the through flow of fluid in the conduit.

References Cited in the file of this patent

UNITED STATES PATENTS

| | | |
|---|---|---|
| 1,055,063 | Meriam | Mar. 4, 1913 |
| 1,470,974 | Hardinge | Oct. 16, 1923 |
| 1,805,733 | Eckstine | May 19, 1931 |
| 1,865,316 | Hanrahan et al. | June 28, 1932 |
| 1,911,351 | Cole | May 30, 1933 |
| 2,520,430 | Pearson | Aug. 29, 1950 |
| 2,589,712 | Langsenkamp et al. | Mar. 18, 1952 |